Patented Oct. 21, 1952

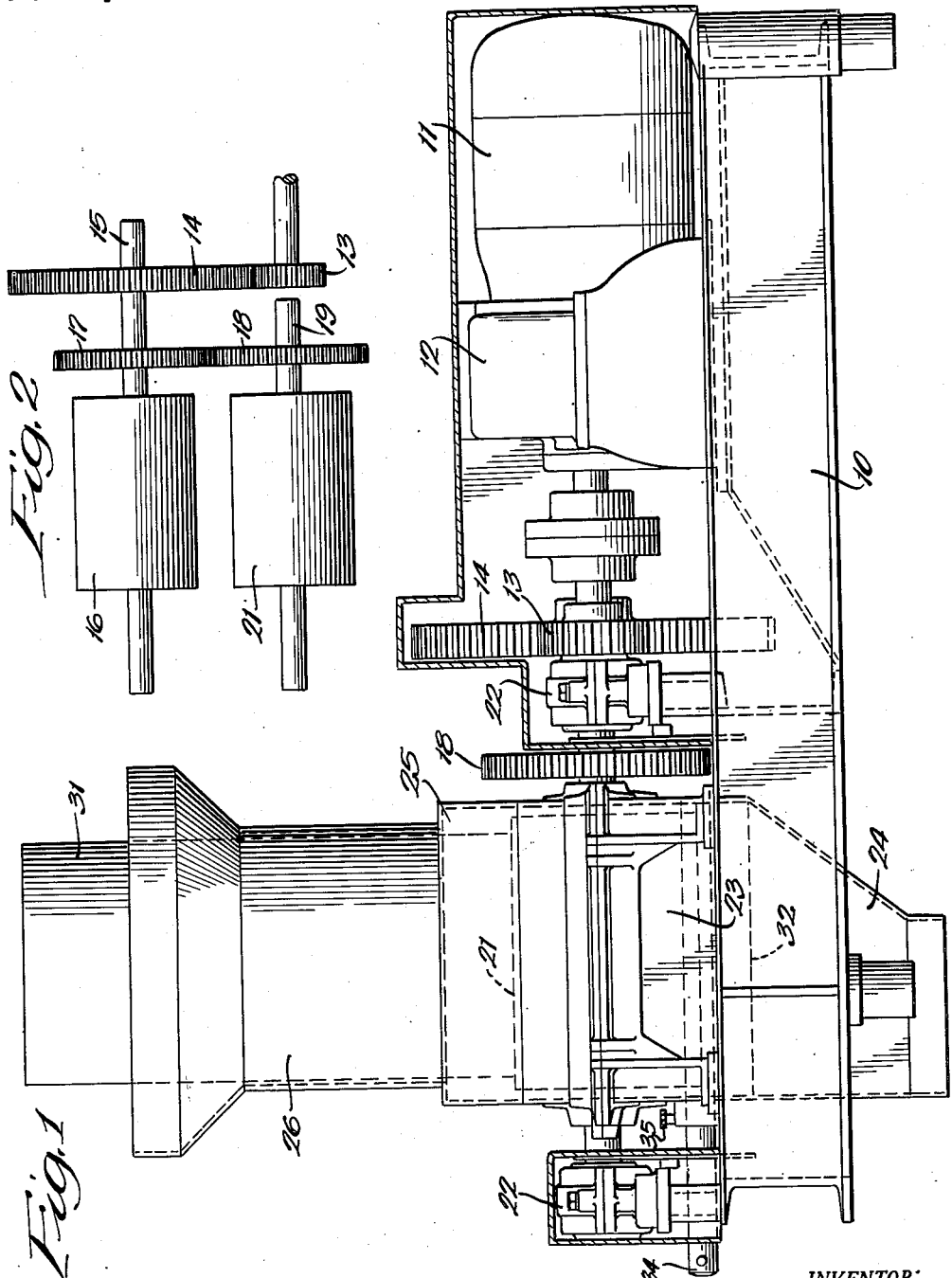
Oct. 21, 1952 — E. G. MAGNUS — 2,614,597
APPARATUS FOR BREAKING UP FROZEN FOODS
Filed Sept. 17, 1949 — 2 SHEETS—SHEET 1
INVENTOR:
Elmer G. Magnus,
BY Dawson, Ooms, Booth and Spangenberg,
ATTORNEYS.

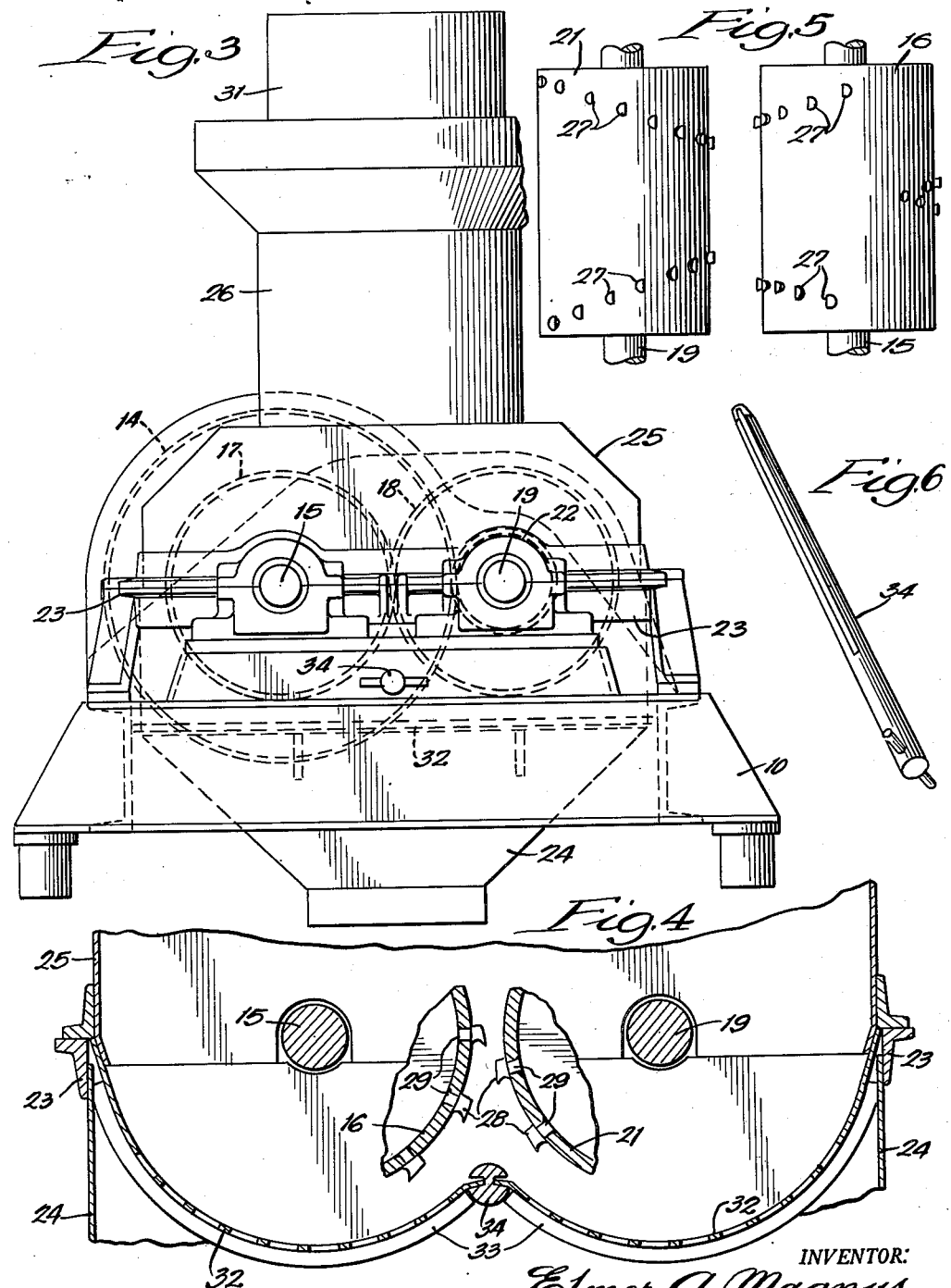

2,614,597

UNITED STATES PATENT OFFICE 2,614,597

APPARATUS FOR BREAKING UP FROZEN FOODS

Elmer G. Magnus, Chicago, Ill., assignor to The W. J. Fitzpatrick Company, Chicago, Ill., a corporation of Illinois Application September 17, 1949, Serial No. 116,240

4 Claims. (Cl. 146—122)

1

This invention relates to riving machines and more particularly to a machine for reducing relatively large masses of frozen food material for rapid thawing.

It has been the practice to package various frozen food materials such as eggs, cream, and the like in relatively large cylindrical containers and to freeze and maintain them under low temperatures for storage. When the materials are to be used, it is necessary to thaw them, and unless they are reduced to relatively small particles it may require twenty-four hours or more at a temperature in excess of 70° F. for complete thawing. In the case of materials which spoil rapidly such as eggs, this is very undesirable since the outer portions of the material may spoil before the inner portions are thawed. It is furthermore very difficult to reduce materials of this sort to particles of relatively small size for rapid thawing, and previous attempts to cut or chop such materials have not met with much success.

It is one of the objects of the present invention to provide a machine for reducing or riving masses of frozen food materials quickly and effectively.

Another object is to provide a riving machine in which a mass of frozen material is confined for limited lateral movement and is alternately acted on at opposite sides to produce a tendency to tilt.

Another object is to provide a riving machine in which the material is removed by relatively small teeth axially and circumferentially spaced on oppositely rotating drums. Preferably, the teeth on each drum are arranged in a V formation with the teeth in opposite legs of the V staggered and with a circumferential space left between the base and apex of the V. This construction produces a progressive cutting or riving of the material and tends to tilt the material into the teeth to insure proper action thereof.

Still another object is to provide a riving machine in which a screen is arranged beneath the rotors or drums through which the material must pass. According to one feature of the invention the edges of the screens are supported by a removable rod having grooves therein to receive the screen edges and which can be removed for easy and complete cleaning.

The above and other objects and advantages of the invention will be more readily apparent when read in connection with the accompanying drawings, in which—

Figure 1 is a side elevation of a riving machine embodying the invention with parts broken away and in section;

2

Figure 2 is a partial plan view illustrating the driving mechanism for the drums;

Figure 3 is an end elevation of the machine;

Figure 4 is a partial transverse section.

Figure 5 is a plan view of the drums illustrating the arrangement of the teeth; and Figure 6 is a perspective view of the removable screen supporting rod.

The machine comprises a base 10 which may be supported on suitable legs or the like and which carries a driving motor 11 acting through a gear reducer 12 to drive a main driving pinion 13. The pinion 13 meshes with a large gear 14 on a rotor shaft 15 which carries a cylindrical drum 16. A gear 17 on the shaft 15 meshes with a similar gear 18 on a shaft 19 parallel to and spaced from the rotor shaft 15. The shaft 19 carries a cylindrical drum 21 parallel to and spaced from the drum 16. When the motor is operated, the drums 16 and 21 will be rotated in opposite directions such that their upper surfaces move toward each other.

The shafts 15 and 19 are mounted in bearings 22 supported by the frame and extend through a lower housing half 23 carried by the frame. The housing 23 is generally rectangular in plan and is open at the bottom and terminates in a discharge chute 24 through which the treated material passes. The top of the housing half 23 is closed by an upper cover 25 which fits over the drums and which carries at its central portion a cylindrical feed chute 26 extending upward with its axis in vertical alignment with the space between the drums. The feed chute is of a size to receive slidably a cylindrical mass of frozen material to be treated so that the mass is held against turning but is permitted to slide downward freely and may have a slight tilting movement. A radial clearance on the order of one-half inch between the frozen cylindrical mass and the feed chute for a mass from twelve to fifteen inches in diameter has been found to be satisfactory. The feed chute, as shown, terminates at its edges substantially in line with the axes of the drums 16 and 21 so that the solid mass of material to be worked on is confined to the inner half of each drum top portion.

For reducing the mass, each of the drums carries a series of teeth 27 which are preferably arranged, as best seen in Figure 5. As shown in Figure 4, each of the teeth has a head portion 28 overlying the drum which may be hollow and formed at its forward edge with an arcuate cut out to leave a chisel shaped cutting tooth projecting forwardly. The heads are supported on reduced shanks 29 which extend through the shells of the drums and may be welded thereto on the drum interiors. Preferably, hard solder or like sealing material is flowed between the drums and the tooth heads to seal the spaces therebetween.

As shown in Figure 5, the teeth on each of the drums are arranged in a V-shaped formation with the teeth in opposite legs of the V circumferentially staggered. In addition, the length of the V is such that a circumferential space will be left between the base and apex of the V. When the drums are connected by the driving gearing, they are turned, as shown in Figure 5, so that the teeth thereon are out of register. It will be noted that the axial spacing between adjacent teeth is such that complete coverage of the frozen mass by the teeth will be obtained as the drums rotate.

With this construction when a frozen cylindrical mass, as indicated at 31 in Figures 1 and 3, is fed through the chute 26 the teeth on each of the drums will progressively act on it, first on one side and then at the other, tending to produce a lateral tilting action. The tilting is limited by the chute but is sufficient to insure that each tooth will obtain a full bite and tends to hold the material down against the teeth. When the circumferential space between the base and apex of a V comes opposite the material, the opposite drum tends to tilt the material into the space thereby insuring that the starting teeth will obtain a full bite. In this way the frozen material is rapidly reduced to relatively small particles so that it can thaw quickly before there is any opportunity for spoiling.

According to one important feature of the invention, the space below the drums is closed by screens. As best seen in Figure 4, a pair of curved perforated screens or plates 32 are supported below the drums in spaced relationship thereto and are provided with openings through which material removed from the mass can pass. In the event any large chunks of material are broken or torn from the mass, they will be held on the screens and carried around until they have been reduced to the desired size.

The screens are supported by arcuate tracks or shoulders 33 at the ends of the casing which receive the curved ends of the screens. For inserting the screens, the cover 25 is removed, and they are slipped inwardly from the sides of the casing 23 onto the shoulders 33.

The inner edges of the screens are supported by an elongated rod 34 formed with grooves in its sides into which the edges of the screens extend. The rod 34 is slidably inserted through openings in the ends of the casing 23 aligned with and below the space between the drums. The rod may be held in place by a screw or similar fastening 35, as best seen in Figure 1.

When the rod and screens are in place the edges of the screens are securely held and sealed by the grooves in the rod. When the machine is to be disassembled for cleaning, the fastening 35 may be released and the rod pulled out in order that free access may be had to the grooves for cleaning them. This is important in treating foods, since any particles left in the grooves would rapidly decay and thorough cleaning of the machine is essential.

The construction of the present invention has been found to reduce frozen materials rapidly and effectively so that they can thaw quickly without spoilage. For example, with a machine in which the teeth 27 are approximately one-half inch long and of substantially equal width, it has been found that a thirty pound cylinder of frozen eggs can be reduced to small particles in about one minute. Similar results are obtained with other materials such as cream and the like.

While one embodiment of the invention has been shown and described in detail herein, it will be understood that this is illustrative only and is not to be taken as a definition of the scope of the invention, reference being had for this purpose to the appended claims.

What is claimed is:

1. A riving machine comprising a pair of cylindrical drums rotatable on spaced parallel horizontal axes, means for driving the drums so that their top surfaces turn toward each other, a plurality of axially and circumferentially spaced teeth projecting outward from each of the drums, the teeth being of substantially the same height as their width and being small relative to the drum, and an elongated vertical cylindrical feed chute projecting above the drums and aligned with the space between them with its edges terminating substantially in line with the axes of the drums and terminating at its bottom closely adjacent to the drums slidably to receive a solid body of material to be treated of substantially the same cross section and size as the chute, the chute holding the body of material against tilting and the body of material resting at its lower end on the cylindrical surfaces of the drums, and a screen underlying and spaced from the drums through which the treated material must pass.

2. A riving machine comprising a housing open at its bottom for discharge of material, a pair of rotors in the housing rotatable on spaced horizontal axes, track means at opposite ends of the housing to support the ends of curved screens beneath the rotors, a pair of curved screens slidable from the sides of the housing to positions beneath the rotors, a rod insertable and removable through openings in the housing ends beneath and registering with the space between the rotors and having grooves in its sides to receive and anchor the edges of the screens.

3. The construction of claim 2 in which the rotors are cylindrical and have axially and circumferentially spaced teeth projecting therefrom.

4. The construction of claim 1 in which the teeth on each drum are arranged in a V-formation with the teeth in opposite legs of the V circumferentially staggered.

ELMER G. MAGNUS.

REFERENCES CITED

The following references are of record in the file of this patent:

UNITED STATES PATENTS

| Number | Name | Date |
|---|---|---|
| 37,482 | Amelang | Jan 27, 1863 |
| 897,829 | Harper | Sept. 1, 1908 |
| 1,355,021 | Waller | Oct. 5, 1920 |
| 1,433,042 | Sedberry | Oct. 24, 1922 |
| 2,223,542 | Bauer | Dec. 3, 1940 |

FOREIGN PATENTS

| Number | Country | Date |
|---|---|---|
| 516,101 | Great Britain | Dec. 21, 1939 |